US012802956B2

(12) United States Patent
You et al.

(10) Patent No.: US 12,802,956 B2

(45) Date of Patent: Nov. 17, 2026

(54) REMOTE CHAMBER AND DART-MS SYSTEM USING SAME

(71) Applicant: LG Chem, Ltd., Seoul (KR)

(72) Inventors: Hyun Sik You, Daejeon (KR); Yongjin Bae, Daejeon (KR); Young Hee Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 277 days.

(21) Appl. No.: 18/279,545

(22) PCT Filed: Sep. 22, 2022

(86) PCT No.: PCT/KR2022/014146

§ 371 (c)(1),
(2) Date: Aug. 30, 2023

(87) PCT Pub. No.: WO2023/113163

PCT Pub. Date: Jun. 22, 2023

(65) Prior Publication Data

US 2024/0304432 A1 Sep. 12, 2024

(30) Foreign Application Priority Data

Dec. 14, 2021 (KR) ........................ 10-2021-0178827
Sep. 21, 2022 (KR) ........................ 10-2022-0118993

(51) Int. Cl.
*H01J 49/04* (2006.01)
*H01J 49/14* (2006.01)

(52) U.S. Cl.
CPC ...... *H01J 49/0463* (2013.01); *H01J 49/0418* (2013.01); *H01J 49/0468* (2013.01); *H01J 49/14* (2013.01)

(58) Field of Classification Search
None
See application file for complete search history.

(56) References Cited

U.S. PATENT DOCUMENTS 3,654,457 A * 4/1972 Yano ........................ H01J 49/14
313/231.01
6,006,584 A * 12/1999 Itoi ..................... H01J 49/0468
250/288

(Continued)

FOREIGN PATENT DOCUMENTS

CN 109923408 A * 6/2019 ............. G01N 27/64
CN 108074793 B 11/2019

(Continued)

OTHER PUBLICATIONS

English machine translation for JP-2004053314-A (Year: 2004).*

(Continued)

*Primary Examiner* — David E Smith
*Assistant Examiner* — Alina Kaliszewski
(74) *Attorney, Agent, or Firm* — Lerner David LLP

(57) ABSTRACT

The present invention relates to a remote chamber and a direct analysis in real time (DART)-mass spectrometry (MS) system using same, and the purpose of the present invention is to provide a remote chamber and a DART-MS system using same, wherein the degree of spatial freedom between a DART device and an MS device can be improved and additional conditions can be applied to a sample.

14 Claims, 7 Drawing Sheets

(56) References Cited

U.S. PATENT DOCUMENTS

| | | | | |
|---|---|---|---|---|
| 10,028,367 | B2 * | 7/2018 | Brandstätter | H05G 2/0094 |
| 10,074,530 | B1 * | 9/2018 | Schlaf | C23C 16/455 |
| 2003/0057368 | A1 * | 3/2003 | Franzen | H01J 49/0418 250/281 |
| 2004/0045497 | A1 | 3/2004 | Kriews et al. | |
| 2005/0161598 | A1 * | 7/2005 | Guevremont | H01J 49/0418 250/294 |
| 2005/0230612 | A1 * | 10/2005 | Weber | H01J 49/162 250/287 |
| 2008/0067359 | A1 * | 3/2008 | Musselman | H01J 49/0409 250/290 |
| 2009/0272893 | A1 | 11/2009 | Hieftje et al. | |
| 2010/0323516 | A1 | 12/2010 | Ishikawa | |
| 2011/0253889 | A1 * | 10/2011 | Ishimaru | H01J 49/145 250/288 |
| 2012/0104244 | A1 | 5/2012 | Verbeck et al. | |
| 2013/0162991 | A1 | 6/2013 | O'Connor et al. | |
| 2013/0299692 | A1 | 11/2013 | Shimada et al. | |
| 2014/0224775 | A1 | 8/2014 | Sharp et al. | |
| 2014/0287953 | A1 * | 9/2014 | Gunther | H01J 49/105 506/9 |
| 2019/0371590 | A1 | 12/2019 | Wilkins et al. | |
| 2021/0166929 | A1 | 6/2021 | Bajic et al. | |
| 2022/0037140 | A1 * | 2/2022 | Jones | G06T 7/11 |
| 2022/0115216 | A1 * | 4/2022 | Ichino | H01L 21/67069 |

FOREIGN PATENT DOCUMENTS

| | | | | | |
|---|---|---|---|---|---|
| EP | 1348123 | A1 | | 10/2003 | |
| EP | 3240014 | A1 | * | 11/2017 | H01J 49/0463 |
| EP | 3483925 | A1 | * | 5/2019 | H01L 21/67103 |
| JP | H11-64283 | A | | 3/1999 | |
| JP | 2004053314 | A | * | 2/2004 | |
| JP | 2015-506467 | A | | 3/2015 | |
| JP | 5873443 | B2 | | 3/2016 | |
| JP | 2016-519393 | A | | 6/2016 | |
| JP | 2019-521526 | A | | 7/2019 | |
| JP | 6594983 | B2 | | 10/2019 | |
| JP | 6607770 | B2 | | 11/2019 | |
| JP | 2021175969 | A | * | 11/2021 | |
| KR | 20090088963 | A | | 8/2009 | |
| KR | 20150134373 | A | | 12/2015 | |
| KR | 20170059388 | A | | 5/2017 | |
| KR | 20210030699 | A | | 3/2021 | |
| WO | WO-9417385 | A1 | * | 8/1994 | G01N 1/4022 |
| WO | WO-2014108323 | A1 | * | 7/2014 | B01L 3/0262 |
| WO | WO-2020055133 | A1 | * | 3/2020 | H01J 49/26 |

OTHER PUBLICATIONS

English machine translation for CN-109923408-A (Year: 2019).*

English machine translation for WO-2020055133-A1 (Year: 2020).*

English machine translation for JP-2021175969-A (Year: 2021).*

English machine translation for WO-9417385-A1 (Year: 1994).*

Extended European Search Report including Written Opinion for Application No. 22907634.4 dated Jul. 23, 2024. 9 pgs.

International Search Report for PCT/KR2022/014146 mailed Jan. 10, 2023. 4 pages.

Schilling Gregory D. et al: "Use of an ambient ionization flowing atmospheric-pressure afterglow source for elemental analysis through hydride generation", Journal of Analytical Atomic Spectrometry, vol. 24, No. 1, Jan. 1, 2009 (Jan. 1, 2009), pp. 34-40, XP093431643. 7 pgs.

* cited by examiner

[Fig. 1]
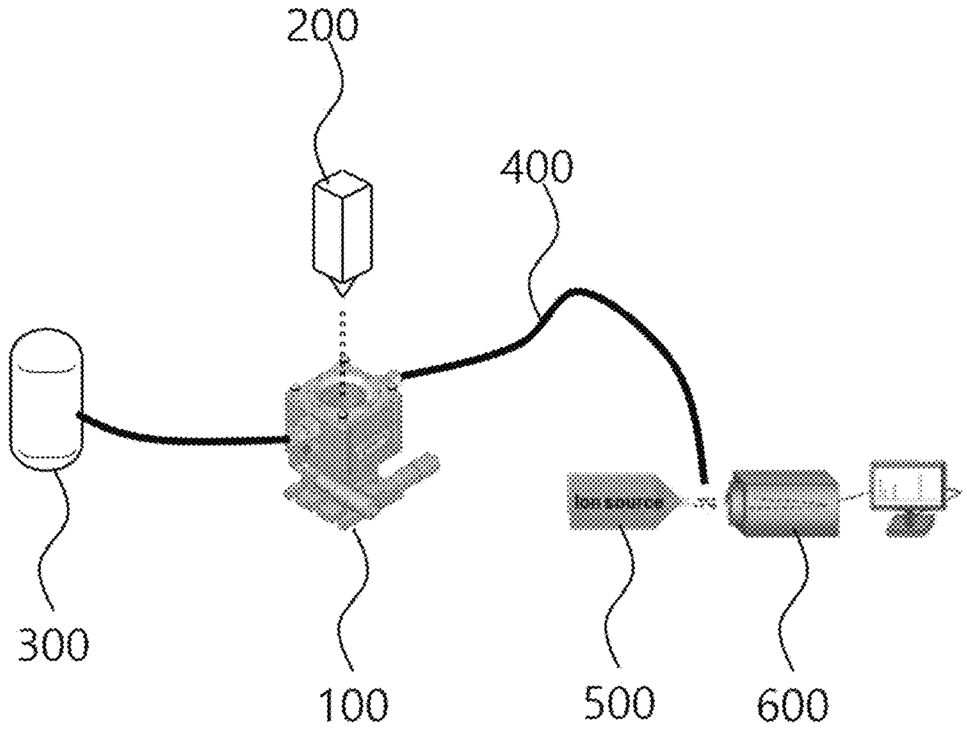
[Fig. 2]
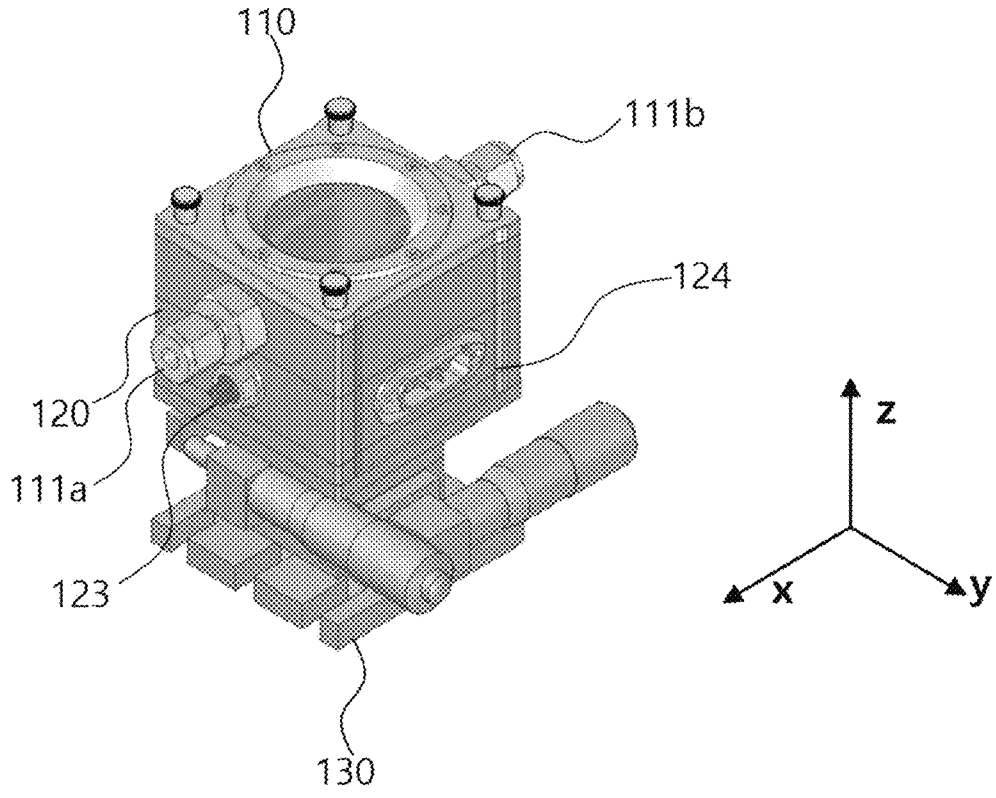

[Fig. 3]
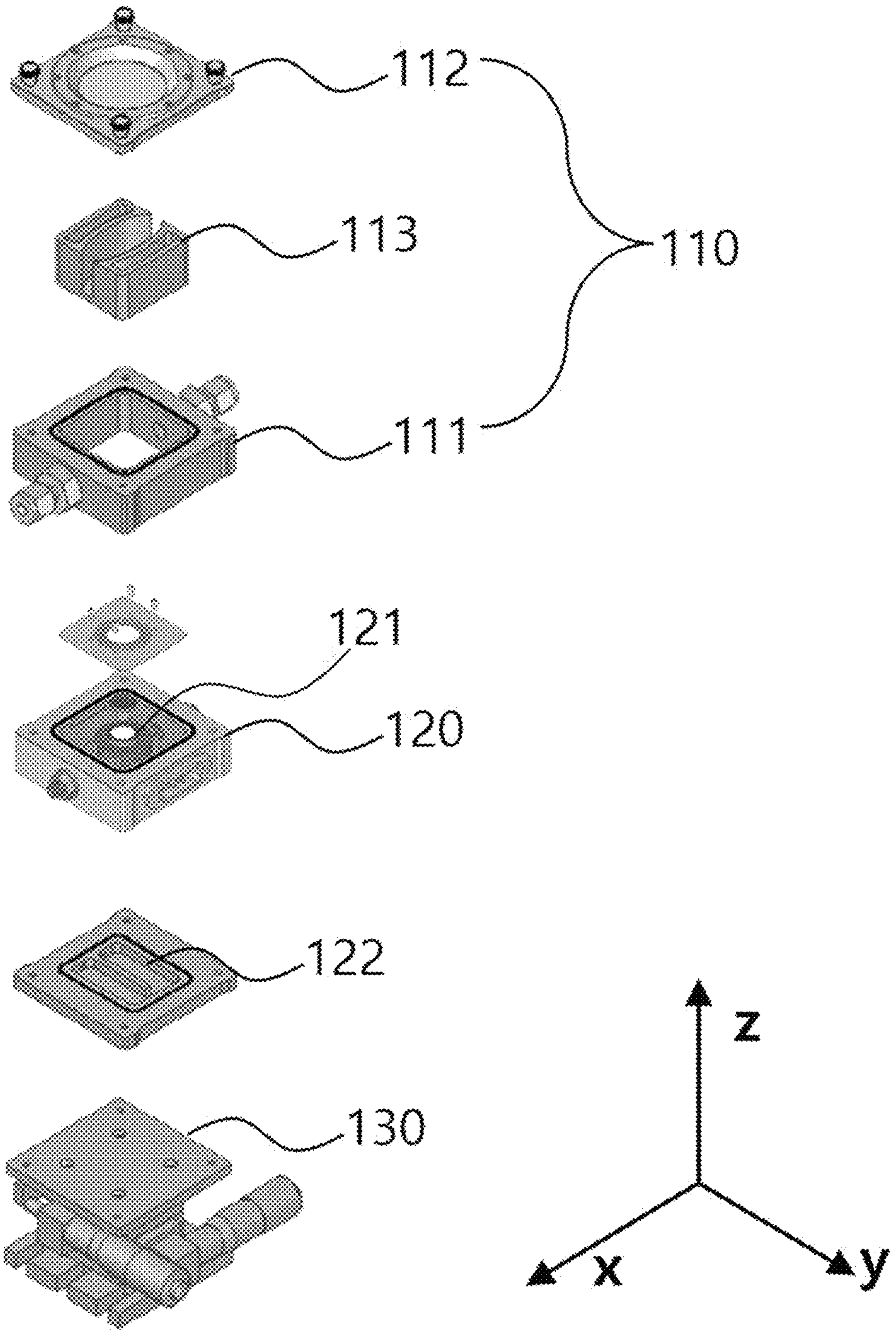

[Fig. 4]
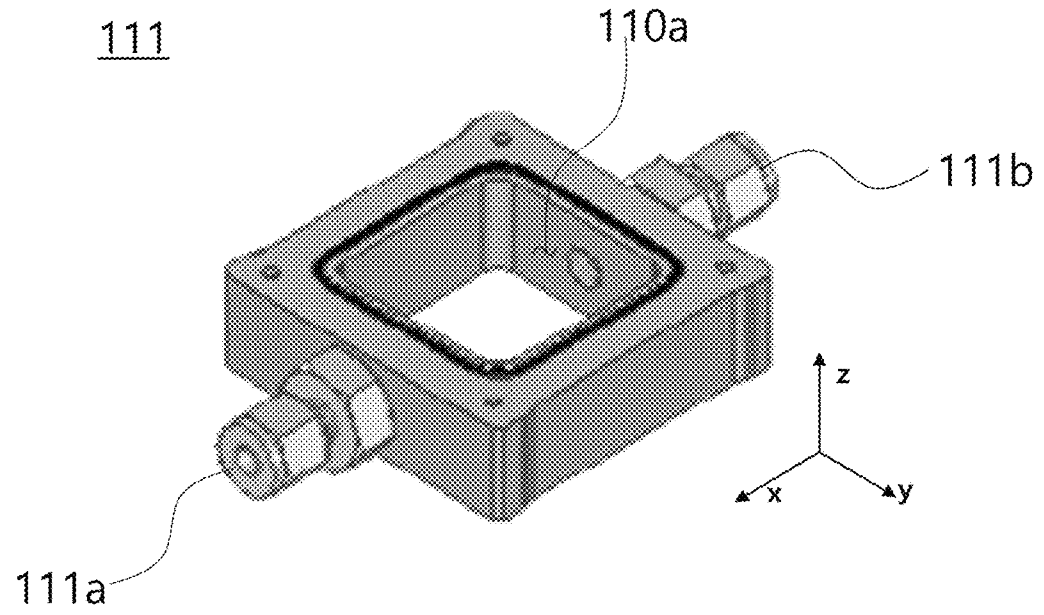
[Fig. 5]
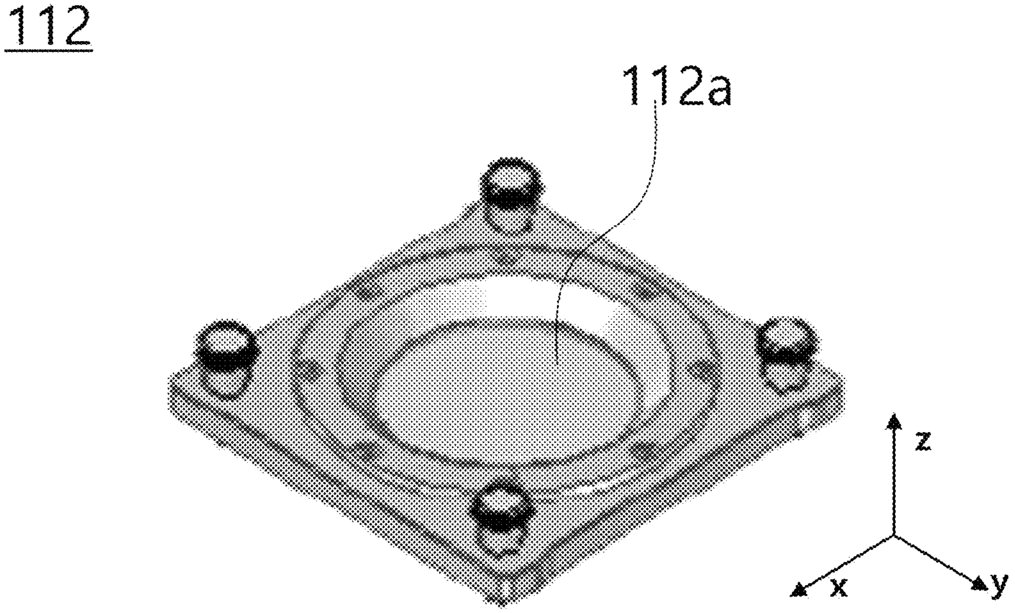

[Fig. 6]
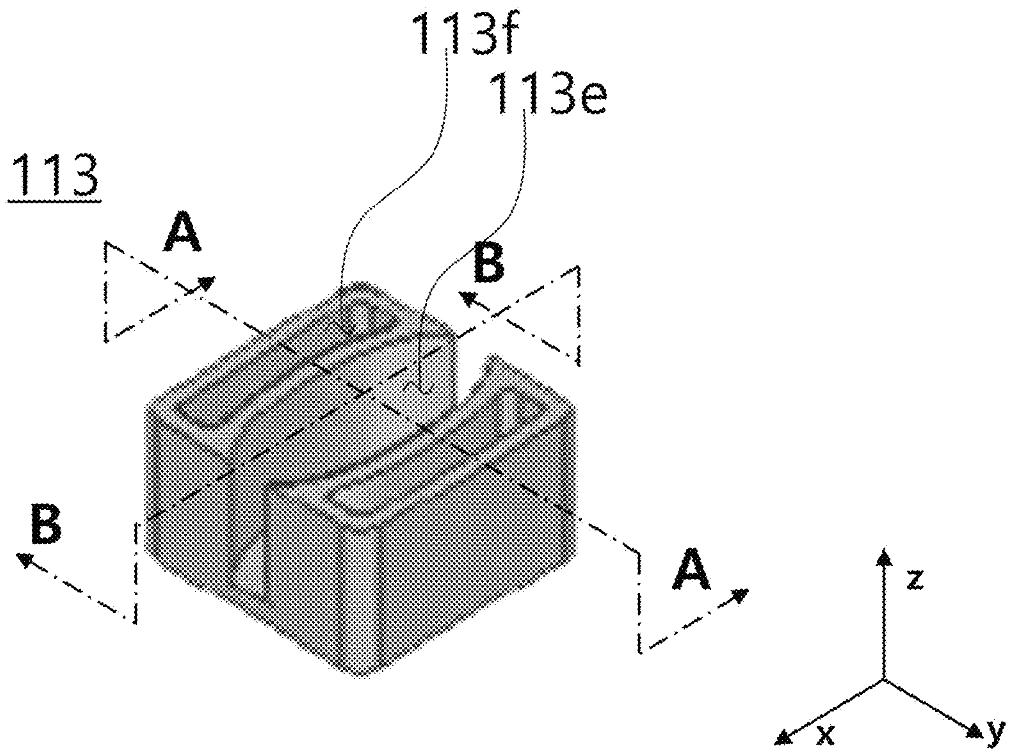
[Fig. 7]
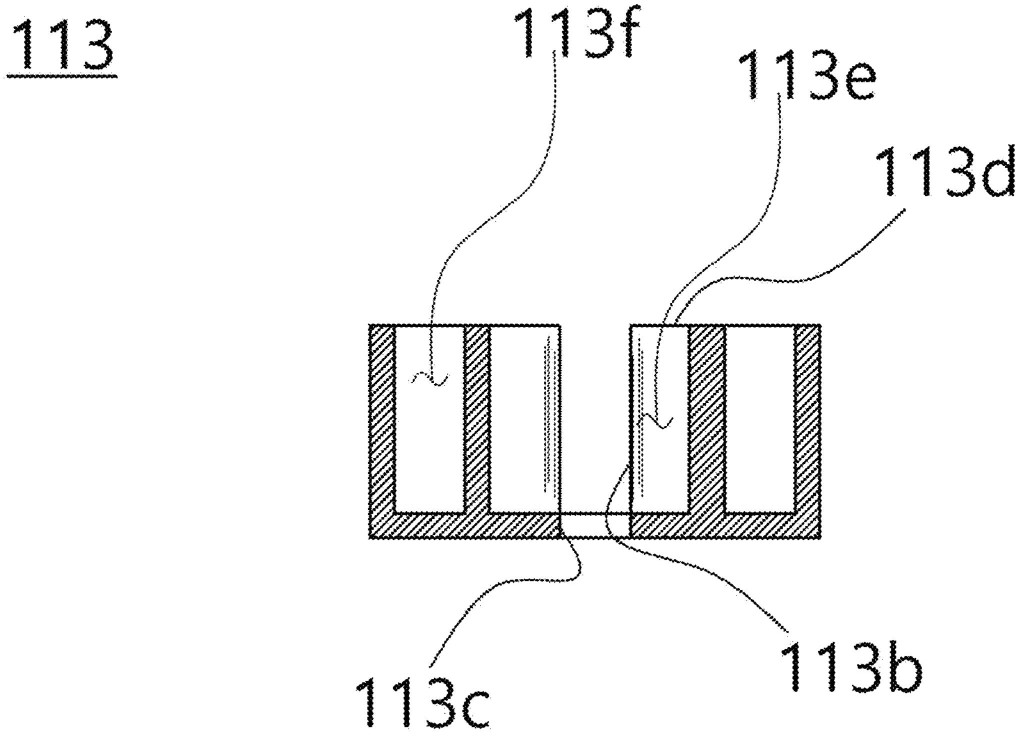

[Fig. 8]
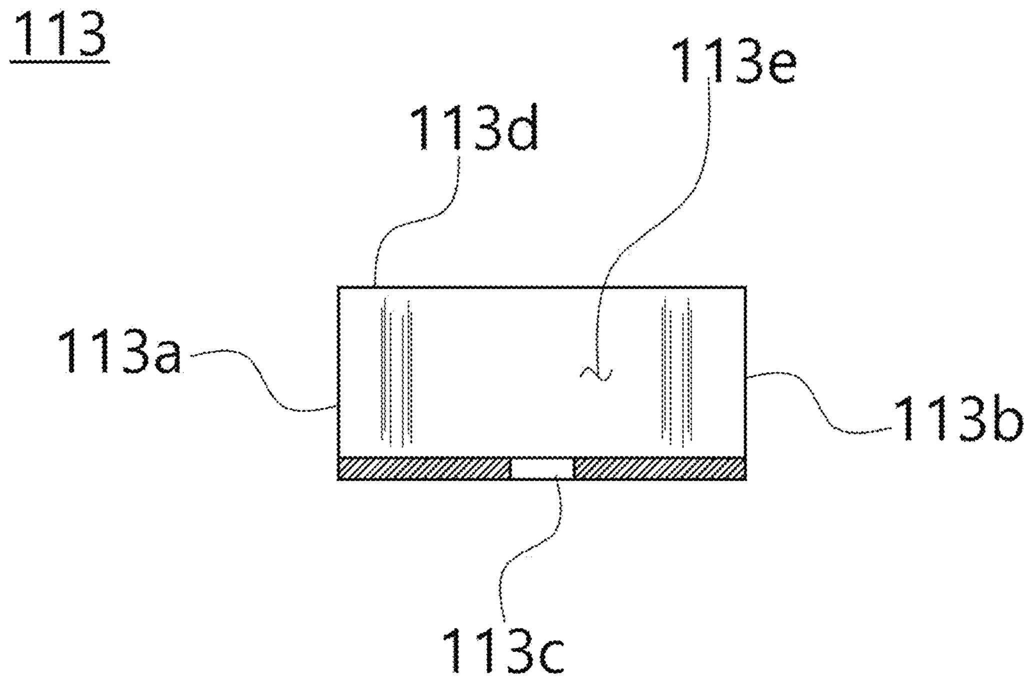
[Fig. 9]
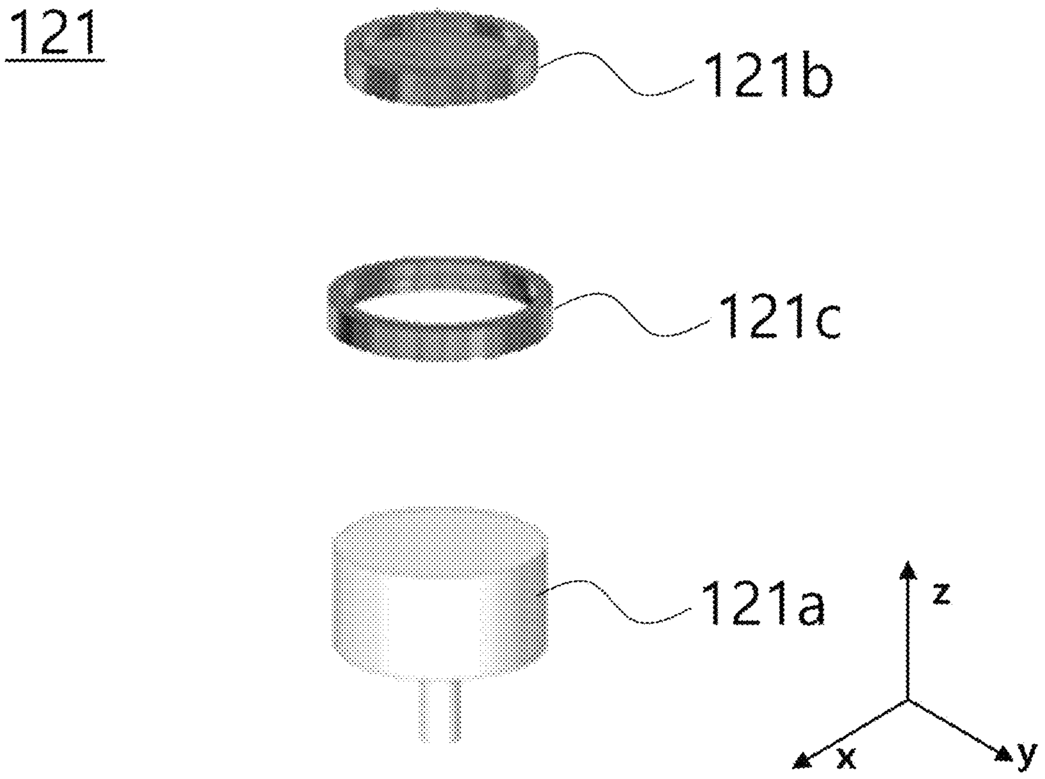

[Fig. 10]
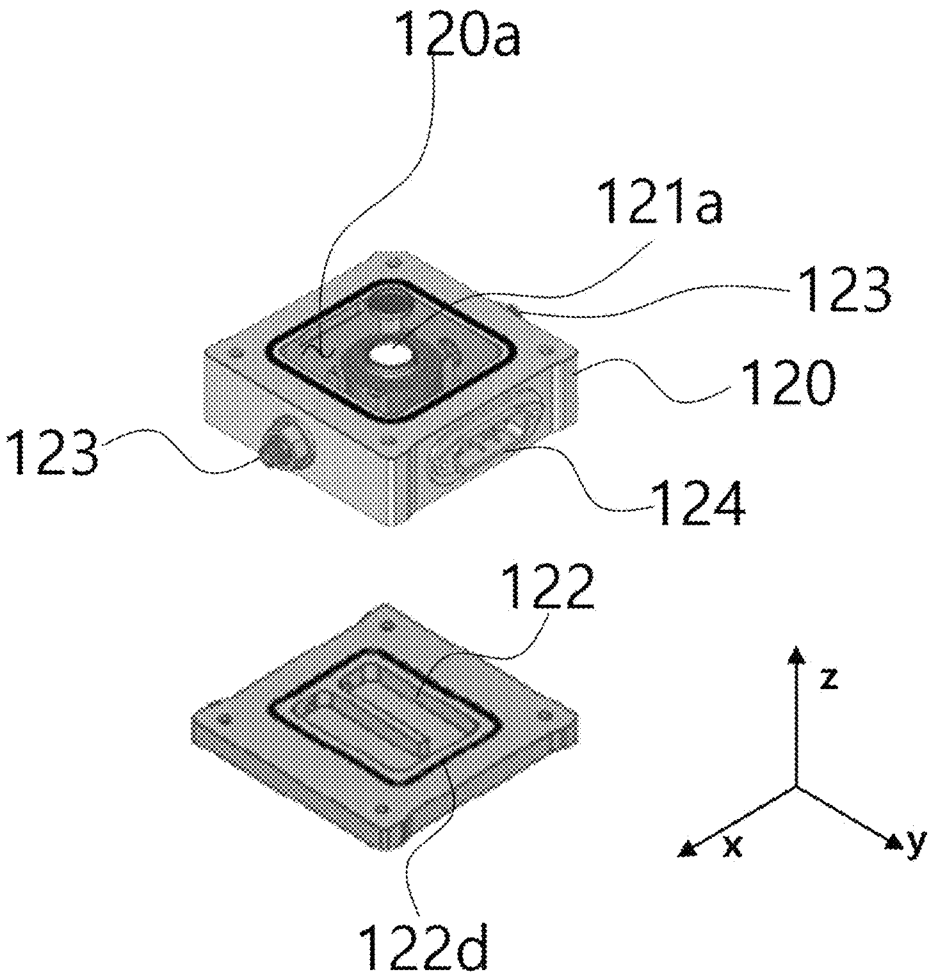
[Fig. 11]
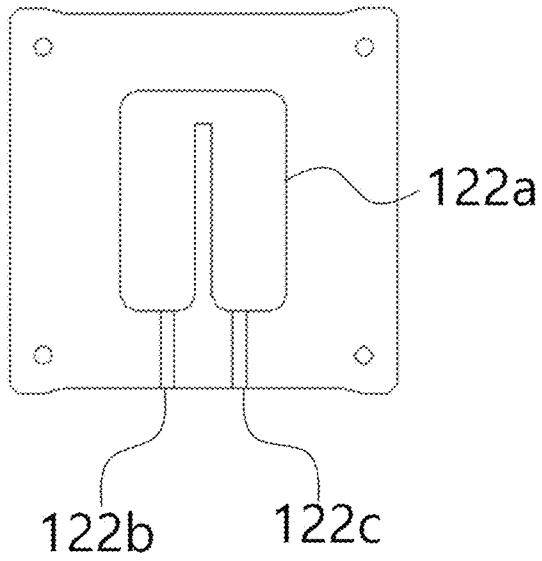

[Fig. 12]
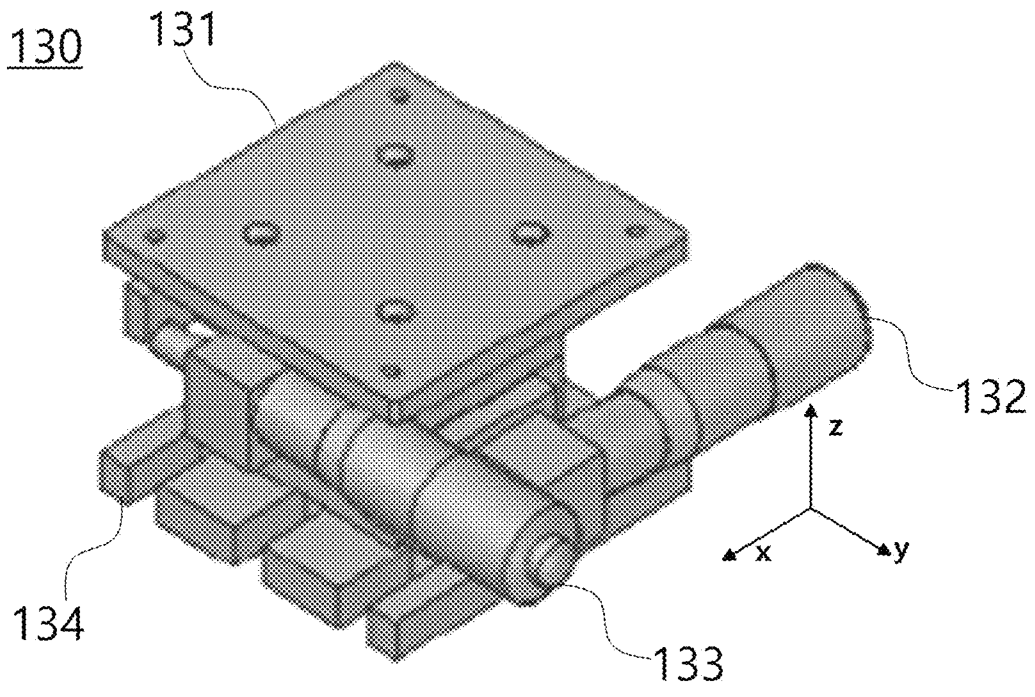

REMOTE CHAMBER AND DART-MS SYSTEM USING SAME

CROSS-REFERENCE TO RELATED APPLICATIONS

This application is a national phase entry under 35 U.S.C. § 371 of International Application No. PCT/KR2022/014146, filed on Sep. 22, 2022, which claims priority to Korean Patent Applications No. 10-2021-0178827, filed on Dec. 14, 2021, and No. 10-2022-0118993, filed on Sep. 21, 2022, the entire disclosures of which are hereby incorporated herein by reference.

TECHNICAL FIELD

The present disclosure relates to a remote chamber and a DART-MS system using the same, and to a remote chamber capable of enhancing the degree of spatial freedom between a direct analysis in real time (DART) instrument and a mass spectrometry (MS) instrument and giving additional conditions to a sample, and a DART-MS system using the same.

BACKGROUND ART

Ambient ionization mass spectrometry is a mass spectrometry technique in which sample preparation processes are minimized, with capability of quickly analyzing the molecular weight and structure of a target material through the ionization process in the atmosphere.

Direct analysis in real time-mass spectrometry (DART-MS) is an apparatus capable of analyzing molecular weight and structure of materials by desorption and ionization of the target material using heated metastable He gas from an ion source and reactive ions generated therefrom. Despite of advantages of simply carrying out analysis by positioning the sample between the ion source and the MS under atmospheric pressure, technological development is required for increasing the concentration of a sample in the atmosphere and improving the signal-to-noise ratio of the spectrum thereby for application to a wider range of samples. From this point of view, the desorption efficiency of the sample, the ionization efficiency, and the efficient collection and transmission of the generated ions may be important factors for improving detection sensitivity.

In addition, since sampling in ambient mass spectrometry such as DART-MS, DESI-MS, LA-DART-MS, LAESI-MS, and the like is carried out in an open space, apparatuses must be densely arranged to secure a certain level of detection sensitivity, and such the arrangement hinders the introduction of additional analytical instruments such as optical microscopy and devices for giving additional conditions (light, heat, electricity, vacuum, etc.) to the sample, thus limiting the size of the sample that is applicable.

Therefore, an analytical apparatus capable of overcoming the above issues and grasping the complexity of the sample is required.

DISCLOSURE OF THE INVENTION

Technical Goals

The present disclosure relates to a remote chamber and a DART-MS system using the same, and an object of the present disclosure is to provide a remote chamber capable of enhancing the degree of spatial freedom between a direct analysis in real time (DART) instrument and a mass spectrometry (MS) instrument and giving additional conditions to a sample, and a DART-MS system using the same.

Technical objects to be achieved by the present disclosure are not limited to the technical problems mentioned above, and other technical objects not mentioned will be clearly understood from the description below by those of ordinary skill in the art to which the present disclosure pertains.

Technical Solutions

A remote chamber of the present disclosure may include a lower chamber in which a sample is accommodated; and an upper chamber which is coupled to an upper end of the lower chamber and in which a guide flow path, into which a component desorbed from the sample flows, is formed, wherein a first space configured to receive the desorbed component from the lower chamber may be formed inside the upper chamber, a second space which is a space for accommodating the sample may be formed inside the lower chamber, and the first space and the second space may be connected to be ventilated to each other.

In the remote chamber of the present disclosure, the upper chamber may include a sidewall part of which upper and lower portions are opened, a ceiling coupled to an upper end of the sidewall part, an inlet formed on one side wall of the sidewall part for carrier gas to be injected, an outlet formed on the other side wall of the sidewall part to discharge the carrier gas and the component desorbed from the sample, and a gas guide which is inserted into the first space and in which the guide flow path is formed.

A DART-MS system of the present disclosure may include a remote chamber configured to accommodate a sample therein; a light source unit configured to irradiate a laser to the sample through a window formed at an upper end of the remote chamber; a carrier gas supply unit configured to supply carrier gas to an internal space of the remote chamber through an inlet formed in the remote chamber; a gas transfer tube having one end connected to an outlet formed in the remote chamber and configured to discharge a material to be analyzed separated from the sample; an ionization unit configured to ionize the material to be analyzed by emitting a helium beam to the material to be analyzed discharged to the other end of the gas transfer tube; and a mass spectrometry unit configured to intake and analyze the ionized material to be analyzed, wherein the remote chamber may include an upper chamber which is provided with the window, inlet, and outlet and in which a first space is formed, and a lower chamber which is coupled to a lower end of the upper chamber and in which a second space configured to accommodate the sample is formed.

Advantageous Effects

A remote chamber and a DART-MS system using the same of the present disclosure may enhance the degree of spatial freedom between a direct analysis in real time (DART) instrument and a mass spectrometry (MS) instrument and give additional conditions to the sample.

A remote chamber and a DART-MS system using the same of the present disclosure have a remote chamber capable of light irradiation, temperature and vacuum control, electricity supply, and gas flow, thereby enabling in-situ mass spectrometry.

BRIEF DESCRIPTION OF DRAWINGS

FIG. 1 is a conceptual diagram illustrating a DART-MS system of the present disclosure.

FIG. 2 is a perspective view illustrating a remote chamber.

FIG. 3 is a exploded perspective view illustrating a remote chamber.

FIG. 4 is a perspective view illustrating a sidewall part of an upper chamber.

FIG. 5 is a perspective view illustrating a ceiling of an upper chamber.

FIG. 6 is a perspective view illustrating a gas guide.

FIG. 7 is an A-A cross-section of FIG. 6.

FIG. 8 is a B-B cross-section of FIG. 6.

FIG. 9 is an exploded perspective view illustrating a heater.

FIG. 10 is a perspective view illustrating a state in which a bottom surface of a lower chamber is separated.

FIG. 11 is a floor plan illustrating a bottom surface of a lower chamber.

FIG. 12 is a perspective view illustrating a horizontal moving stage.

BEST MODE FOR CARRYING OUT THE INVENTION

A remote chamber of the present disclosure may include:

a lower chamber in which a sample is accommodated; and an upper chamber which is coupled to an upper end of the lower chamber and in which a guide flow path, into which a component desorbed from the sample flows, is formed, wherein a first space configured to receive the desorbed component from the lower chamber may be formed inside the upper chamber, a second space which is a space for accommodating the sample may be formed inside the lower chamber, and the first space and the second space may be connected to be ventilated to each other.

In the remote chamber of the present disclosure, the upper chamber may include a sidewall part of which upper and lower portions are opened, a ceiling coupled to an upper end of the sidewall part, an inlet formed on one side wall of the sidewall part for carrier gas to be injected, an outlet formed on the other side wall of the sidewall part to discharge the carrier gas and the component desorbed from the sample, and a gas guide which is inserted into the first space and in which the guide flow path is formed.

In the remote chamber of the present disclosure, the gas guide may include a first opening facing the inlet, a second opening facing the outlet, and a third opening facing the sample, the first opening may be located at one end of the guide flow path, the second opening may be located at the other end of the guide flow path, and the third opening may be located downward from the center of the guide flow path.

In the remote chamber of the present disclosure, when a direction perpendicular to a vertical direction is a first direction, and a direction perpendicular to the vertical direction and the first direction is a second direction, the guide flow path may extend in the first direction, the third opening may be located between the first opening and the second opening on the first direction, a length of the guide flow path in the second direction may become shorter as it is closer to the first opening from the center of the third opening, and the length of the guide flow path in the second direction may become shorter as it is closer to the second opening from the center of the third opening.

In the remote chamber of the present disclosure, on a cross-section perpendicular to a vertical direction of the gas guide, the guide flow path may be provided in a streamlined shape with a major axis in the first direction and a minor axis in the second direction.

In the remote chamber of the present disclosure, a window formed of a material capable of transmitting light may be formed in the ceiling, the gas guide may further include a fourth opening at a position facing the window, and a laser irradiated from the outside may pass through the window, the fourth opening, and the third opening to be irradiated onto the sample.

In the second space of the remote chamber of the present disclosure, a heater configured to heat the sample may be provided in the second space, a lower end of the heater may be fixed to a bottom surface of the lower chamber, and a side surface of the heater may be separated from an inner surface of the lower chamber.

In the remote chamber of the present disclosure, the heater may be configured to heat the sample to a temperature of 20° C. to 1000° C.

In the remote chamber of the present disclosure, the heater may include a heating member configured to generate heat, and a sample mounting disk fixed to an upper end of the heating member.

In the remote chamber of the present disclosure, the heater may further include a ring-shaped guide ring coupled to a circumference of the sample mounting disk, and a vertical length of the guide ring may be longer than that of the sample mounting disk.

In the remote chamber of the present disclosure, the sample mounting disk and the guide ring may be formed of gold coated copper or stainless steel.

In the remote chamber of the present disclosure, a cooling flow path configured to cool the second space may be formed on the bottom surface of the lower chamber.

A DART-MS system of the present disclosure may include a remote chamber configured to accommodate a sample therein; a light source unit configured to irradiate a laser to the sample through a window formed at an upper end of the remote chamber; a carrier gas supply unit configured to supply carrier gas to an internal space of the remote chamber through an inlet formed in the remote chamber; a gas transfer tube having one end connected to an outlet formed in the remote chamber and configured to discharge a material to be analyzed separated from the sample; an ionization unit configured to ionize the material to be analyzed by emitting a helium beam to the material to be analyzed discharged to the other end of the gas transfer tube; and a mass spectrometry unit configured to intake and analyze the ionized material to be analyzed, wherein the remote chamber may include an upper chamber which is provided with the window, inlet, and outlet and in which a first space is formed, and a lower chamber which is coupled to a lower end of the upper chamber and in which a second space configured to accommodate the sample is formed.

In the DART-MS system of the present disclosure, the lower end of the upper chamber and an upper end of the lower chamber may be opened such that the first space and the second space are connected, the window may be formed in an upper end of the upper chamber, the light source unit may be configured to irradiate a laser downward from an upper portion of the remote chamber, and the laser may reach the sample by passing through the window.

In the DART-MS system of the present disclosure, a horizontal moving stage configured to adjust a position of the remote chamber may be coupled to a lower end of the remote chamber.

MODES FOR CARRYING OUT THE INVENTION

Hereinafter, example embodiments according to the present disclosure will be described in detail with reference to the accompanying drawings. Here, the size or shape of components shown in the drawings may be exaggerated for clarity and convenience of explanation. In addition, terms specifically defined in consideration of configurations and operations of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product of the present disclosure is used, are merely for the description and brief illustration of the present disclosure, and should not be construed as limiting the present disclosure because they are not suggesting or implying that the indicated apparatus or element must be configured or operated in the specified orientation with the specified orientation.

FIG. 1 is a conceptual diagram illustrating a DART-MS system of the present disclosure. FIG. 2 is a perspective view illustrating a remote chamber 100. FIG. 3 is an exploded perspective view illustrating the remote chamber 100. FIG. 4 is a perspective view illustrating a sidewall part 111 of an upper chamber 110. FIG. 5 is a perspective view illustrating a ceiling 112 of the upper chamber 110. FIG. 6 is a perspective view illustrating a gas guide 113. FIG. 7 is an A-A cross-section of FIG. 6. FIG. 8 is a B-B cross-section of FIG. 6. FIG. 9 is an exploded perspective view illustrating a heater 121. FIG. 10 is a perspective view illustrating a state in which a bottom surface of a lower chamber 120 is separated. FIG. 11 is a floor plan illustrating the bottom surface of the lower chamber 120. FIG. 12 is a perspective view illustrating a horizontal moving stage 130.

Hereinafter, with reference to FIGS. 1 to 12, the remote chamber of the present disclosure and the DART-MS system using the same will be described in detail.

As shown in FIG. 1, the DART-MS system of the present disclosure may include:

- the remote chamber 100 configured to accommodate a sample therein;
- a light source unit 200 configured to irradiate a laser to the sample through a window 112*a* formed at an upper end of the remote chamber 100;
- a carrier gas supply unit 300 configured to supply carrier gas to an internal space of the remote chamber 100 through an inlet 111*a* formed in the remote chamber 100;
- a gas transfer tube 400 having one end connected to an outlet 111*b* formed in the remote chamber 100 and configured to discharge a material to be analyzed separated from the sample;
- an ionization unit 500 configured to ionize the material to be analyzed by emitting a helium beam to the material to be analyzed discharged to the other end of the gas transfer tube 400; and
- a mass spectrometry unit 600 configured to intake and analyze the ionized material to be analyzed.

The light source unit 200 to emit a laser may be configured to emit the laser downward from the upper portion of the remote chamber 100, and the laser emitted from the light source unit 200 may reach the sample located inside the remote chamber 100 by passing through the window 112*a* provided at the upper end of the remote chamber 100. The light source unit 200 may be selected among laser light sources in the range of UV to IR. For example, the light source unit 200 may be a light source that emits a laser in a wavelength of about 400 nm.

The carrier gas supply unit 300 may be configured to supply gas carrying a component desorbed from the sample into the remote chamber 100. The carrier gas injected into the remote chamber 100 through the carrier gas supply unit 300 may push the component desorbed from the sample into the gas transfer tube 400 to face heated meta-stable beam at an outlet port of the gas transfer tube 400. The carrier gas supplied by the carrier gas supply unit 300 may be nitrogen, helium, neon, argon, and the like.

The gas transfer tube 400 may be a flow path configured to allow aerosol generated inside the remote chamber 100 to move to a location where the ionization unit 500 emits a helium beam. For example, the gas transfer tube 400 may be a Teflon tube, urethane tube, silicone tube, and the like. The gas transfer tube 400 may be provided in a length of several centimeters to tens of meters and preferably formed of in a flexible material for the degree of freedom in the layout relationship among devices. For example, the gas transfer tube 400 may be provided in a length of 50 cm to 100 cm.

The ionization unit 500 may be configured to emit a heated meta-stable beam to the component desorbed from the sample. The ionization unit 500 may be disposed to allow an emission port of the ionization unit 500 from which the helium beam is emitted to face an inlet port of the mass spectrometry unit 600.

The mass spectrometry unit 600 may be a mass spectrometer and configured to separate and detect ionized molecules with different mass-to-charge ratios (m/z).

As shown in FIGS. 2 and 3, the remote chamber 100 may include an upper chamber 110 in which the window 112*a*, inlet 111*a*, and outlet 111*b* are provided and a first space 110*a* is formed and a lower chamber 120 which is coupled to a lower end of the upper chamber 110 and in which a second space 120*a* configured to accommodate the sample is formed.

The lower end of the upper chamber 110 and the upper end of the lower chamber 120 may be opened to connect the first space 110*a* and the second space 120*a*, the window 112*a* may be formed at the upper end of the upper chamber 110, the light source unit 200 may be configured to irradiate the laser downward from the upper portion of the remote chamber 100, and the laser may reach the sample by passing through the window 112*a*.

In other words, in the remote chamber 100, the lower chamber 120 may be configured to accommodate a sample therein, the second space 120*a* may be formed as a space in which conditions such as voltage or current application, heating, and cooling are given to the sample, and the first space 110*a* may be formed, in the upper chamber 110, as a space configured to receive the component desorbed from the sample located in the second space 120*a* of the lower chamber 120 to discharge the component to a gas discharge tube.

As shown in FIG. 4, the sidewall part 111 of the upper chamber 110 may be provided as a rectangular framework whose upper and lower portions are opened. The sidewall part 111 may be provided with the inlet 111*a* and the outlet 111*b*. More specifically, the inlet 111*a* and the outlet 111*b* may be respectively formed on the two side walls that are facing each other among the four side walls of the sidewall part 111, and the inlet 111*a* and the outlet 111*b* may be located to face each other at each side wall. Accordingly, the carrier gas introduced into the inlet 111*a* may flow in a straight line and be discharged to the outlet 111*b* along with the components desorbed from the sample.

If necessary, if vacuum formation is required inside the remote chamber 100, a vacuum pump may be connected to the inlet 111*a* or the outlet 111*b* to form a vacuum inside the remote chamber 100.

As shown in FIG. 5, the ceiling in which the window 112*a* is formed may be coupled to the upper end of the sidewall part 111. The ceiling 112 may be formed as a plate perpendicular to the vertical direction in which a hole is formed, and the hole may be covered with a material capable of transmitting light to form the window 112*a*. More specifically, the window 112*a* may be provided with a material through which the laser generated by the light source unit 200 is penetrable.

The gas guide 113 may be inserted into the first space 110*a*. The gas guide 113 may prevent the carrier gas carrying the component desorbed from the sample from forming a vortex by colliding with inner walls in the upper chamber 110 and limit a space through which the actual fluid flows to enhance the detection sensitivity.

As shown in FIGS. 6 to 8, the gas guide 113 may include a first opening 113*a* configured to face the inlet 111*a*, a second opening 113*b* configured to face the outlet 111*b*, a third opening 113*c* configured to face the sample, a fourth opening 113*d* configured to face the window 112*a*, and a guide flow path 113*e* connected to the first opening 113*a*, the second opening 113*b*, the third opening 113*c*, and the fourth opening 113*d* and configured to guide the flow of the material to be analyzed.

Specifically, in correspondence to the inlet 111*a* and the outlet 111*b* that are formed to face each other on each of the paired side walls of the upper chamber 110 facing each other, the first opening 113*a* and the second opening 113*b* may be located on side surfaces, the third opening 113*c* may be formed at the bottom surface, and the fourth opening 113*d* may be formed on the ceiling surface. In other words, the guide flow path 113*e* may be provided as a streamlined flow path that extends in the x-axis direction, as shown in FIG. 6, wherein the first opening 113*a* may be located at one end of the guide flow path 113*e*, the second opening 113*b* may be located at the other end of the guide flow path 113*e*, the third opening 113*c* may be located downward from the center of the guide flow path 113*e*, and the fourth opening 113*d* may be located upward from the center of the guide flow path 113*e*.

In other words, setting the x-axis direction as a first direction and the y-axis direction as a second direction, the guide flow path 113*e* may be provided in a shape extending in the first direction. The third opening 113*c* in the first direction may be located between the first opening 113*a* and the second opening 113*b*.

The length of the guide flow path 113*e* in the second direction may become shorter as it is closer to the first opening 113*a* from the center of the third opening 113*c*, and that of the guide flow path 113*e* in the second direction may become shorter as it is closer to the second opening 113*b* from the center of the third opening 113*c*. In other words, the guide flow path 113*e* may be provided in a shape whose width tapers as it is closer to the inlet 111*a* or the outlet 111*b* from the center. A pair of side walls connecting the first opening 113*a* and the second opening 113*b* may be provided as a curved surface of a shape that is plane-symmetrical to each other.

For example, on a cross-section perpendicular to the vertical direction of the gas guide 113, the guide flow path 113*e* may be provided in a streamlined shape having the first direction as a major axis and the second direction as a minor axis.

In the gas guide 113, thermal insulation hollows 113*f* may be formed on both sides of the guide flow path 113*e*. The thermal insulation hollow 113*f* may be configured to minimize heat generated by the heater 121 to be delivered to the surrounding area through the gas guide 113, so as to prevent deterioration of the remote chamber 100 itself and the apparatuses mounted or coupled to the remote chamber 100.

In the second space 120*a*, the heater 121 configured to heat the sample may be provided, wherein the lower end of the heater 121 may be fixed to the bottom surface of the lower chamber 120, whereas the side surface of the heater 121 may be spaced apart from the inner surface of the lower chamber 120. The heater 121 may be configured to heat the sample to a temperature of 20° C. to 1000° C. As another example, the heater 121 may be configured to heat the sample to a temperature of 20° C. to 750° C.

As shown in FIG. 9, the heater 121 may include a heating member 121*a* configured to generate heat and a sample mounting disk 121*b* fixed to the upper end of the heating member 121*a*.

The heating member 121*a* may be a ceramic heater, a peltier heater, or the like.

The sample mounting disk 121*b* is formed with a groove on the upper surface to stably mount the sample in the powder state.

The heater 121 may further include a ring-shaped guide ring 121*c* which is coupled to the circumference of the sample mounting disk 121*b*, and the length of the guide ring 121*c* in the vertical direction may be longer than that in the vertical direction of the sample mounting disk 121*b*. The guide ring 121*c* may be configured to allow the sample mounting disk 121*b* to be stably fixed at the upper end of the heating member 121*a*.

The sample mounting disk 121*b* and the guide ring 121*c* may be formed of gold coated copper or stainless steel. That is, the sample mounting disk 121*b* and the guide ring 121*c* may be formed of a material having excellent thermal conductivity.

On the bottom surface of the lower chamber 120, a cooling flow path 122 configured to cool the second space 120*a* may be formed.

A feedthrough 123 may be provided on the side wall of the lower chamber 120 to supply electricity to the sample through an external charge-discharge device. The feedthrough 123 may be provided in a pair, that is, two, each of which may be located on each different side wall of the lower chamber 120.

Formed on another side wall of the lower chamber 120 may be a heater terminal 124 which is configured to electrically connect a temperature controller located outside the heater 121 and the remote chamber 100.

For example, the lower chamber 120 may be provided in a cuboidal shape that is opened to the upper surface. Here, two feedthroughs 123 may be located on each of the pair of side walls facing each other, and the heater terminal 124 may be located on one of the remaining side walls.

As shown in FIGS. 10 and 11, the bottom surface of the lower chamber 120 may have a structure in which two layers of plates overlap, and a U-shaped curved flow path 122*a* may be formed as a groove on the upper surface of the lower plate. A cooling fluid may flow into the U-shaped curved flow path 122*a* to cool the remote chamber 100. Formed at both ends of the U-shaped curved flow path 122*a* respectively may be an injection flow path 122*b* into which a cooling fluid is injected and a discharge flow path 122*c* through which the cooling fluid is discharged. Formed on the upper surface of the lower plate may be a sealing member insertion groove 122*d* which is configured to surround the groove of the U-shaped curve.

As shown in FIG. 12, the lower end of the remote chamber 100 may be coupled with the horizontal moving stage 130 configured to adjust the position of the remote chamber 100. The horizontal moving stage 130 may be configured to adjust the position of the remote chamber 100 on two orthogonal axes perpendicular to the upward direction.

Specifically, the horizontal moving stage 130 may include a fixture 134 fixed onto the ground surface, a moving plate 131 coupled to the upper end of the fixture 134 and configured to be movable relative to the fixture 134 in a horizontal direction, and a first horizontality adjustment member 132 and a second horizontality adjustment member 133 configured to adjust horizontal movement of the moving plate 131.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

DESCRIPTION OF SYMBOLS

100 . . . Remote chamber, 110 . . . Upper chamber, 110*a* . . . First space, 111 . . . Sidewall part, 111*a* . . . Inlet, 111*b* . . . Outlet, 112 . . . Ceiling, 112*a* . . . Window, 113 . . . Gas guide, 113*a* . . . First opening, 113*b* . . . Second opening, 113*c* . . . Third opening, 113*d* . . . Fourth opening, 113*e* . . . Guide flow path, 113*f* . . . Thermal insulation hollow, 120 . . . Lower chamber, 120*a* . . . Second space, 121 . . . Heater, 121*a* . . . Heating member, 121*b* . . . Sample mounting disk, 121*c* . . . Guide ring, 122 . . . Cooling flow path, 122*a* . . . U-shaped curved flow path, 122*b* . . . Injection flow path, 122*c* . . . Discharge flow path, 122*d* . . . Sealing member insertion groove, 123 . . . Feedthrough, 124 . . . Heater terminal, 130 . . . Horizontal moving stage, 131 . . . Moving plate, 132 . . . First horizontality adjustment member, 133 . . . Second horizontality adjustment member, 134 . . . Fixture, 200 . . . Light source unit, 300 . . . Carrier gas supply unit, 400 . . . Gas transfer tube, 500 . . . Ionization unit, 600*s* . . . Mass spectrometry unit

INDUSTRIAL APPLICABILITY

A remote chamber and a DART-MS system using the same of the present disclosure may enhance the degree of spatial freedom between a direct analysis in real time (DART) instrument and a mass spectrometry (MS) instrument and give additional conditions to the sample.

A remote chamber and a DART-MS system using the same of the present disclosure have a remote chamber capable of light irradiation, temperature and vacuum control, electricity supply, and gas flow, thereby enabling in-situ mass spectrometry.

The invention claimed is:

1. A remote chamber, comprising:

a lower chamber configured to receive a sample accommodated therein; and an upper chamber which is coupled to an upper end of the lower chamber and in which a guide flow path is formed, wherein the upper chamber defines therein a first space configured to receive a component desorbed from the sample from the lower chamber, the lower chamber defines therein a second space configured to receive the sample therein, and the first space and the second space are connected to each other, wherein the upper chamber comprises a sidewall part having open upper and lower portions, a ceiling coupled to an upper end of the sidewall part, an inlet formed in a first side wall of the sidewall part, the inlet configured to receive an injection of a carrier gas therethrough, an outlet formed in a second side wall of the sidewall part, the outlet configured to receive a discharge of the carrier gas and the component desorbed from the sample, and a gas guide which is disposed in the first space and in which the guide flow path is formed, wherein the gas guide comprises a first opening facing the inlet, a second opening facing the outlet, and a third opening configured to face the sample, and wherein the first opening is located at a first end of the guide flow path, the second opening is located at a second end of the guide flow path, and the third opening is located below a center of the guide flow path, wherein a direction perpendicular to a vertical direction is a first direction, and a direction perpendicular to the vertical direction and the first direction is a second direction, and wherein the guide flow path extends in the first direction, the third opening is located between the first opening and the second opening in the first direction, a length of the guide flow path in the second direction becomes shorter as it is closer to the first opening from the center of the third opening, and the length of the guide flow path in the second direction becomes shorter as it is closer to the second opening from the center of the third opening, wherein a pair of side walls connecting the first opening and the second opening may be provided as a curved surface of a shape that is plane-symmetrical to each other in both the first direction and the second direction, and wherein a cross-section of the gas guide that is parallel to both the first direction and the second direction forms a single central area having a major axis extending in the first direction and a minor axis extending in the second direction, such that all portions of the sidewall part face inward toward the single central area.

2. The remote chamber of claim 1, wherein, in a cross-section perpendicular to a vertical direction of the gas guide, the guide flow path has a streamlined shape with a major axis in the first direction and a minor axis in the second direction.

3. The remote chamber of claim 1, wherein the ceiling has a window formed therein of a material configured to transmit light therethrough, the gas guide further comprises a fourth opening at a position facing the window, and the remote chamber is configured to receive irradiation of a laser passing through the window, the fourth opening, and the third opening to be irradiated onto the sample.

4. The remote chamber of claim 1, further comprising a heater disposed within the second space, the heater configured to heat the sample, a lower end of the heater is fixed to a bottom surface of the lower chamber, and a side surface of the heater is separated from an inner surface of the lower chamber.

5. The remote chamber of claim 4, wherein the heater is configured to heat the sample to a temperature of 20° C. to 1000° C.

6. The remote chamber of claim 5, wherein the heater comprises:

a heating member configured to generate heat; and a sample mounting disk fixed to an upper end of the heating member.

7. The remote chamber of claim 6, wherein the heater further comprises a ring-shaped guide ring coupled to an outer circumference of the sample mounting disk, and a vertical length of the guide ring is longer than a vertical length of the sample mounting disk.

8. The remote chamber of claim 7, wherein the sample mounting disk and the guide ring are formed of gold coated copper or stainless steel.

9. The remote chamber of claim 4, wherein the bottom surface of the lower chamber defines a cooling flow path therein configured to cool the second space.

10. A DART-MS system, comprising:

a remote chamber configured to accommodate a sample therein;

a light source unit configured to irradiate a laser to the sample through a window disposed at an upper end of the remote chamber;

a carrier gas supply unit configured to a supply carrier gas to an internal space of the remote chamber through an inlet extending into the remote chamber;

a gas transfer tube having a first end connected to an outlet extending into the remote chamber and configured to discharge a material separated from the sample;

an ionization unit configured to ionize the material by emitting a helium beam to the material discharged from a second end of the gas transfer tube; and a mass spectrometry unit configured to intake and analyze the material, wherein the remote chamber comprises:

an upper chamber having the window, the inlet, and the outlet, the upper chamber defining a first space therein; and a lower chamber which is coupled to a lower end of the upper chamber, the lower chamber defining therein a second space configured to accommodate the sample, wherein the upper chamber comprises a sidewall part having open upper and lower portions, a ceiling coupled to an upper end of the sidewall part, an inlet formed in a first side wall of the sidewall part and configured to receive an injection of a carrier gas therethrough, an outlet formed in a second side wall of the sidewall part and configured to receive a discharge of the carrier gas and the material separated from the sample, and a gas guide which is disposed in the first space and in which a guide flow path is formed, wherein the gas guide comprises a first opening facing the inlet formed in the first side wall, a second opening facing the outlet formed in the second side wall, and a third opening configured to face the sample, and wherein the first opening is located at a first end of the guide flow path, the second opening is located at a second end of the guide flow path, and the third opening is located below a center of the guide flow path, wherein a direction perpendicular to a vertical direction is a first direction, and a direction perpendicular to the vertical direction and the first direction is a second direction, and wherein the guide flow path extends in the first direction, the third opening is located between the first opening and the second opening in the first direction, a length of the guide flow path in the second direction becomes shorter as it is closer to the first opening from the center of the third opening, and the length of the guide flow path in the second direction becomes shorter as it is closer to the second opening from the center of the third opening, wherein a pair of side walls connecting the first opening and the second opening may be provided as a curved surface of a shape that is plane-symmetrical to each other in both the first direction and the second direction, and wherein a cross-section of the gas guide that is parallel to both the first direction and the second direction forms a single central area having a major axis extending in the first direction and a minor axis extending in the second direction, such that all portions of the sidewall part face inward toward the single central area.

11. The DART-MS system of claim 10, wherein the lower end of the upper chamber and an upper end of the lower chamber are each open such that the first space and the second space are connected, the window is disposed at an upper end of the upper chamber, the light source unit is configured to irradiate a laser downward from an upper portion of the remote chamber, and remote chamber is configured to receive the laser reaching the sample by passing through the window.

12. The DART-MS system of claim 10, further comprising a horizontal moving stage configured to adjust a position of the remote chamber, the horizontal moving stage being coupled to a lower end of the remote chamber.

13. The remote chamber of claim 1, wherein the third opening extends downward from the single central area through a bottom surface of the upper chamber, and an entire upper end of the single central area is a fourth opening covered by the ceiling coupled to the upper end of the sidewall part, the third opening being smaller than the fourth opening.

14. The DART-MS system of claim 10, wherein the third opening extends downward from the single central area through a bottom surface of the upper chamber, and an entire upper end of the single central area is a fourth opening covered by the ceiling coupled to the upper end of the sidewall part, the third opening being smaller than the fourth opening.

* * * * *